United States Patent [19]

Henkel et al.

[11] Patent Number: 4,522,718

[45] Date of Patent: Jun. 11, 1985

[54] MECHANISM FOR LATCHING AN AXIALLY DISPLACEABLE ROTARY PART TO A CONCENTRIC ROTARY PART

[75] Inventors: Donald J. Henkel, Loveland; Donald L. Hurley, Hamilton, both of Ohio

[73] Assignee: The Western States Machine Company, Hamilton, Ohio

[21] Appl. No.: 389,409

[22] Filed: Jun. 17, 1982

[51] Int. Cl.[3] .............................................. B01D 33/06

[52] U.S. Cl. .................................... 210/371; 210/373; 292/302

[58] Field of Search ................................ 210/369-371, 210/373; 292/302-304

[56] References Cited

U.S. PATENT DOCUMENTS

| | | | |
|---|---|---|---|
| 1,903,298 | 4/1933 | Roberts | 210/371 X |
| 2,043,662 | 6/1936 | Howe | 210/371 |
| 2,667,974 | 2/1954 | Hertrich | 210/371 X |
| 3,242,703 | 3/1966 | Brurdage | 210/368 X |
| 4,244,823 | 1/1981 | Wessel et al. | 210/371 |

*Primary Examiner*—Thomas Wyse
*Attorney, Agent, or Firm*—Albert C. Johnston

[57] ABSTRACT

An axially displaceable rotary part is latched securely in a certain axial position relative to a concentric rotary part by a mechanism which includes latch means that are rotated with the concentric part and are displaceable radially relative to it by movements of a ring member so as to engage elements of the latch means with and disengage them from a latchable member of the axially displaceable part. At operating speeds of the system the latch means are urged to latching position by centrifugal force. Although applicable to various rotary mechanical systems, the mechanism is particularly useful as a component of a heavy duty cyclical centrifugal machine for latching the bottom valve member of the centrifugal basket in closed position during the loading and centrifuging stages of each centrifugal operating cycle.

23 Claims, 8 Drawing Figures

MECHANISM FOR LATCHING AN AXIALLY DISPLACEABLE ROTARY PART TO A CONCENTRIC ROTARY PART

This invention relates to a mechanism for latching an axially displaceable rotary part securely in a certain axial position relative to a concentric rotary part.

The invention is particularly useful for latching in closed position a bottom valve member of a centrifugal basket in a heavy-duty cyclical centrifugal machine of the type used to separate liquids from solids in large scale industrial processes such as the manufacture or refining of sugar, dextrose, or other crystalline or granular materials. Thus, in a particular aspect, the invention relates to a mechanism for safely and securely positioning the basket bottom valve member of such a centrifugal machine during the centrifuging operations of the machine.

In a broader aspect, the invention is applicable for a variety of uses, such, for instance, as for latching a part of a clutch mechanism out of clutch engaging position, or latching a lower speed gear of a multiple speed gear mechanism away from engaging position under higher speed operating conditions.

A basket bottom valve mechanism for a centrifugal machine of the type mentioned is disclosed in U.S. Pat. No. 4,244,823. The machine includes a suspended rotary shaft, or spindle, carrying on its lower end a cylindrical basket having in its bottom wall an outlet opening through which, after each cycle of rotation of the basket at high speed, the solids separated from liquid by the centrifuging operation are discharged to empty the basket before its next cycle of operation. The basket has a supporting base structure spaced below its bottom wall and fixed to the lower end of the spindle. A basket bottom valve member, generally of frusto-conical form, is slidable on the spindle between a normal upper position in which this member closes the outlet opening and a lower, open position in which centrifuged solids being discharged from the basket can fall through the outlet opening and then away through the space between the base structure and the basket bottom wall. A spring compressed between the base structure and the valve member constantly urges the valve member toward its closed position in the outlet opening. A sleeve extends upward from the valve member about the spindle and has on its upper end an outwardly open annular channel in which rollers are engaged for displacing the valve member to open position against the force of the spring compressed against its under side. These rollers are carried on forked ends of a lever connected with the piston of a fluid pressure operated cylinder by which the required valve opening force can be applied.

Difficulties have been experienced in the use of such a basket bottom valve mechanism as a component of centrifugal machines used for separating sugar from syrup in the sugar industry. After each solids discharging stage of a centrifugal cycle, during which the valve member is held in open position, the valve member is returned to its closed position and a mass of material to be centrifuged in the next cycle is poured quickly into the basket from a loading gate arranged next to the centrifugal machine. In the case of a heavy-duty sugar centrifugal, for instance, the mass of material loaded into the basket for each cycle often weighs as much as 2,000 pounds or more. The stream of material falling into the basket impinges against the valve member, thus requiring a very strong and heavy spring in order to keep the valve member closed during the basket loading operation. This heavy spring force, in turn, requires a much greater force to be exerted by the basket valve operating mechanism in order to move the valve member to open position and hold it there during a discharging operation, when the basket is rotated at a low speed.

Consequently, the rollers acting in the annular channel to open the valve member are subjected to extreme wear under the high forces applied through them, and the serviceability of the valve mechanism is severely impaired. This problem is accentuated in uses of the centrifugal machine for processing granular materials such as sugar, as particles of the material tend to collect on the channel walls engaged by the rollers of the valve operating mechanism and thus to obstruct further the valve opening operation unless the channel is continually kept clean, as by being flushed with a jet of water, which itself objectionably complicates the operations.

A general object of the present invention is to provide, for any of various rotary mechanical systems in which one of a plurality of concentric parts is displaceable axially relative to another of them, a mechanism for latching and holding the one part securely in a certain axial position relative to the other part while the parts are being rotated at a relatively high speed, yet for releasing the one part to enable axial displacement of it under other operating conditions.

A more particular object of the invention is to provide for a centrifugal machine of the type mentioned a mechanism by which the basket valve member can be latched and held securely in closed position during the operations of the machine at speeds greater than those required for discharging solids from the basket, yet which enables easy opening and closing movements of the valve member whenever the basket either is at rest or is being rotated at a low speed suited for the discharging stage of a centrifugal operating cycle.

These and other desirable objectives can be achieved, according to the present invention, by the provision and use of a latching mechanism which serves in the rotary mechanical system for which it is adapted to hold securely in a certain axial position a rotary part that is displaceable axially relative to a concentric rotary part. The latching mechanism comprises latch means rotated with the concentric part and displaceable radially relative to it between a latching position and an unlatching position; a latchable member secured to the axially displaceable part and disposable in the path of the latch means by axial movement of the displaceable part to the certain position, the latch means and the latchable member respectively comprising elements which, with the displaceable part in the certain position, are interengageable to prevent axial displacement of the displaceable part and are disengageable to release the same, respectively, by radial movements of the latch means between its said positions; and displacing means on and movable relative to the concentric part for moving the latch means between the latching and unlatching positions.

According to a further important feature of the invention, the latch means of the mechanism is disposed radially inward when in unlatching position and is displaceable and held radially outward to latching position by centrifugal force upon being rotated with the concentric part toward its full rotational speed. As a result, a safe latching or locking of the displaceable part in the desired certain position is assured during all relatively high speed operations of the rotary mechanical system or machine to which the latching mechanism is applied, and the mechanism is applicable to systems or machines in which the axis of the rotary parts is horizontal or vertical or at any other inclination.

The displacing means of the latching mechanism advantageously includes a ring member which is concentric with the concentric part and comprises cam elements slidably engaging with follower elements on the latch means for moving the latch means between the latching and unlatching positions. The latch means can be provided as arcuate slide jaws disposed symmetrically about the axis of the concentric part, each slide jaw having a radially protruding lip portion to engage with the latchable member, and having on its opposite ends protruding end portions that constitute the follower elements engaging with the cam elements of the ring member. By having the ring member displaceable axially relative to the concentric part, the cam elements can be provided as pairs of oppositely disposed slots in the ring member, which slots are sloped at an angle to the axis of rotation of the parts and have the protruding end portions of each slide jaw engaged slidably in the slots of one of the pairs.

Accordingly, when the invention is applied for latching a rotary part that is displaceable axially relatively to a concentric part such as a shaft rotatable about a vertical axis, as is the case when a centrifugal basket bottom valve member of the type mentioned is to be latched in closed position, the ring member is normally disposed in a lower position relative to the shaft, in which position the slide jaws are disposed radially outward in latching position and their protruding end portions lie in upper regions of the slots; and the slots of each pair are sloped downward and inward toward the axis of rotation so that the slide jaws are displaceable radially inward to unlatching position by upward displacement of the ring member.

A latch operating means suitable for such an application of the invention includes a downwardly facing annular surface on the ring member, an arm mounted beside the shaft and carrying a bearing member engageable slidably against the annular surface, and a motor means, such preferably as a fluid pressure operated cylinder, for lifting the arm so as to engage and lift the ring member on the bearing member and thereby move the latch means to unlatching position when the displaceable part is to be displaced into or from the certain position. Operation of the motor means to lower the arm when the displaceable part is in the certain position will release the ring member for downward movement by gravity or under the centrifugal force of rotation of the slide jaws with the shaft, with resultant radial displacement of the latch means to latching position.

The displaceable part of a machine or system to which the invention is applied can be displaced in various ways into and away from the certain axial position of the latching mechanism. In a case involving a vertical shaft as the concentric part, a positioning means suitable for the displaceable part includes confronting upper and lower annular surfaces spaced apart axially and secured to the displaceable part, as on the walls of a channel structure mentioned above, with a slide member held in the space between the surfaces by an axially slidable means movable by suitable power operated means such, preferably, as a second fluid pressure operated cylinder. The slidable means and the slide member thus can be moved upward against and then with the upper surface for disposing the displaceable part in the certain position, and can be moved downward and with the lower surface to displace that part away from the certain position. Further, according to another feature of the invention, when the displaceable part is latched in the certain position the slidable means can be disposed at a location in which the slide member is held out of contact with the channel surfaces so that it imposes no wear on nor resistance to the rotation of the rotary parts.

According to the invention as it is applied to a cyclical centrifugal machine for latching the bottom valve member of the centrifugal basket in closed position the displaceable rotary part is the bottom valve member with a tubular sleeve or spacer member extending upward from it about the basket-carrying shaft, or spindle, thru and above the space inside the basket; the concentric rotary part is that spindle; and the latchable member is secured to the spacer member. The secure locking of the basket bottom valve member in closed position by the latching mechanism eliminates all need for forces to be applied by a spring or other means in order to keep the valve member closed while the basket is being loaded or during other stages of a centrifuging operation; yet when the basket rotation is stopped or is effected at a low speed suited for discharging solids from the basket, the displacing means of the latching mechanism is easily movable to displace the latch means to unlatching position, thus releasing the valve member for easy displacement to its open position. In this way, the valve member can be assured of keeping the basket bottom outlet closed under all loading and all centrifuging conditions, and the former causes of severe wear on the basket valve operating parts of the machine can be eliminated with consequent improvement of the reliability and continuity of the centrifugal operations.

The above mentioned and other objects, features and advantages of the invention will be further evident from the following detailed description and the accompanying drawings of an illustrative embodiment thereof. In the drawings.

Figure 1:
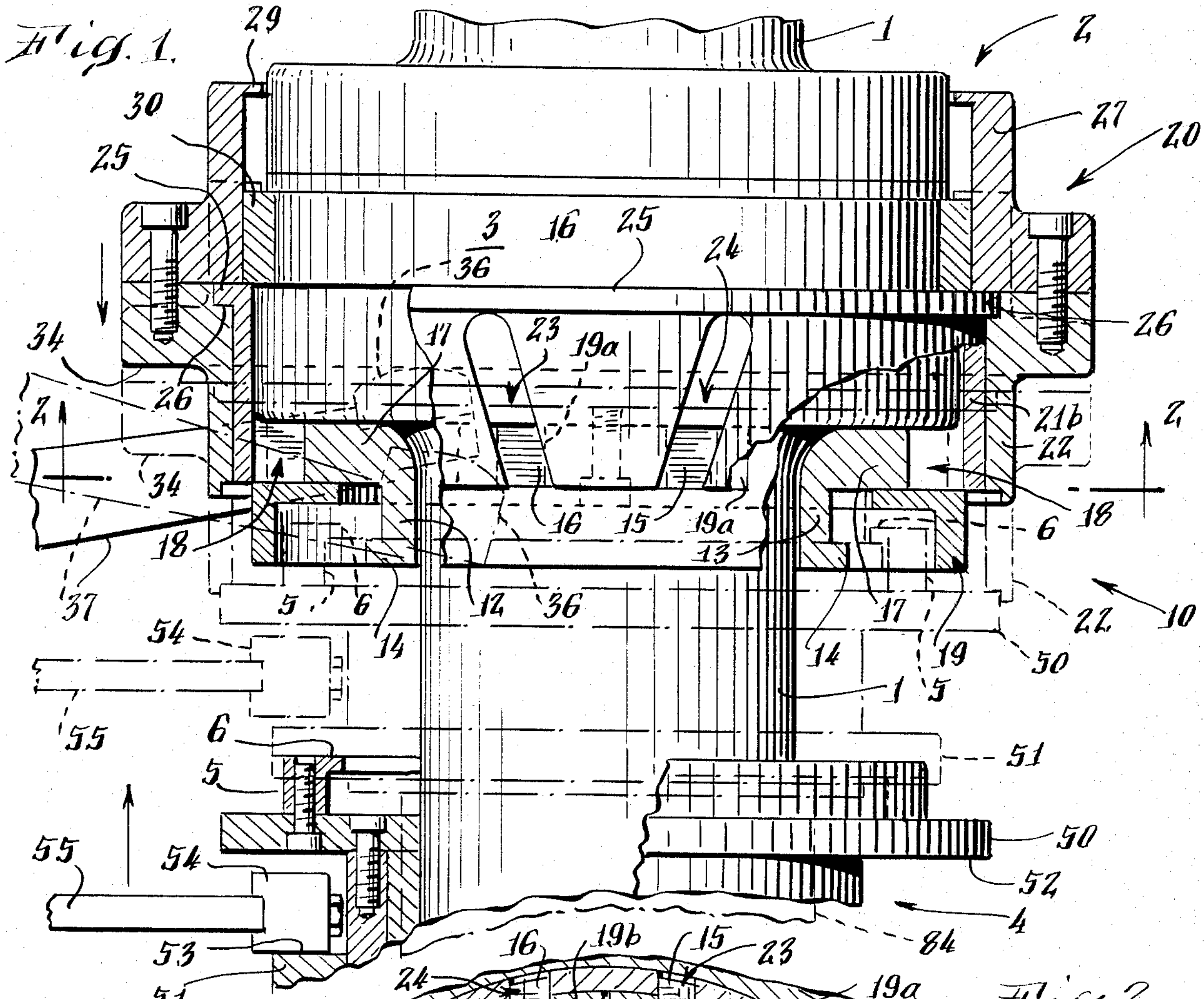
FIG. 1 is a view, partly in elevation and partly in section, of a latching mechanism embodying the invention.
Figure 2:
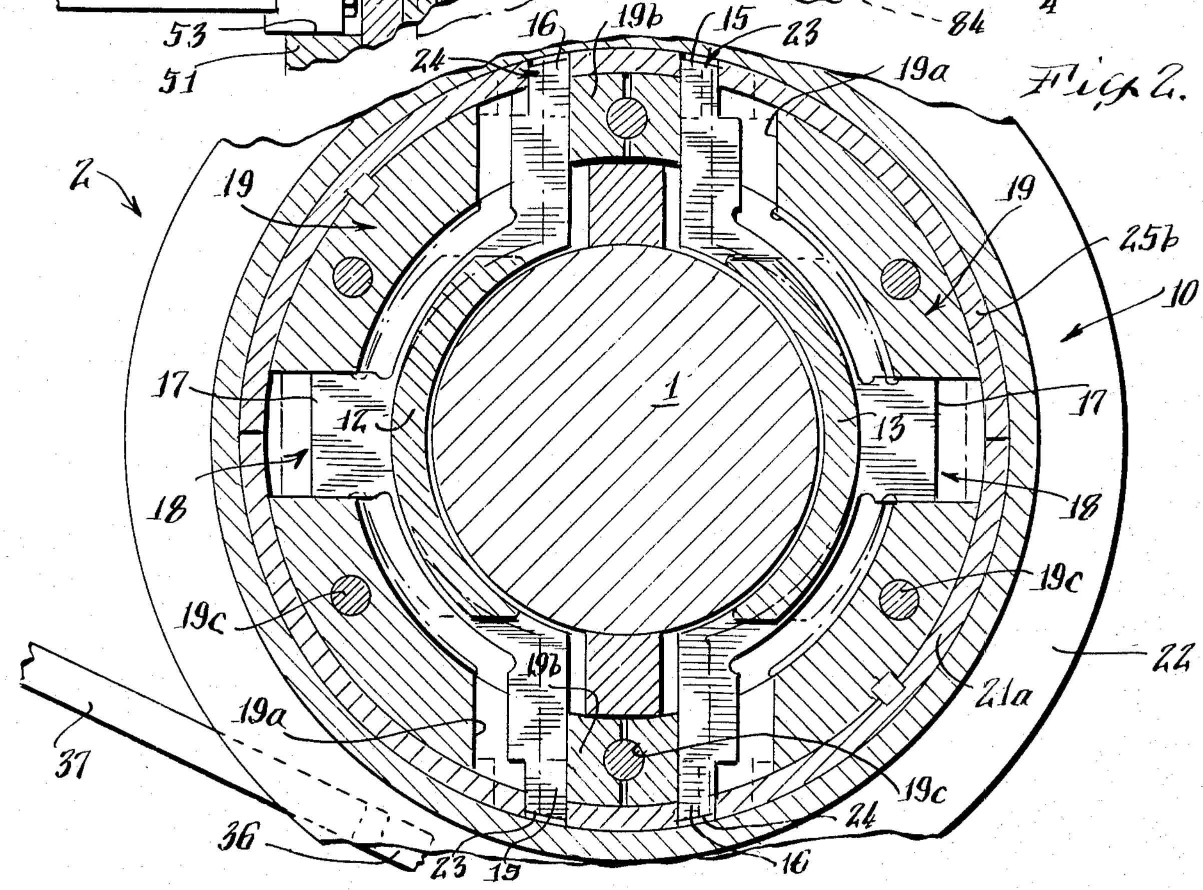
FIG. 2 is a cross sectional view thereof taken at line 2—2 in FIG. 1.
Figure 3:
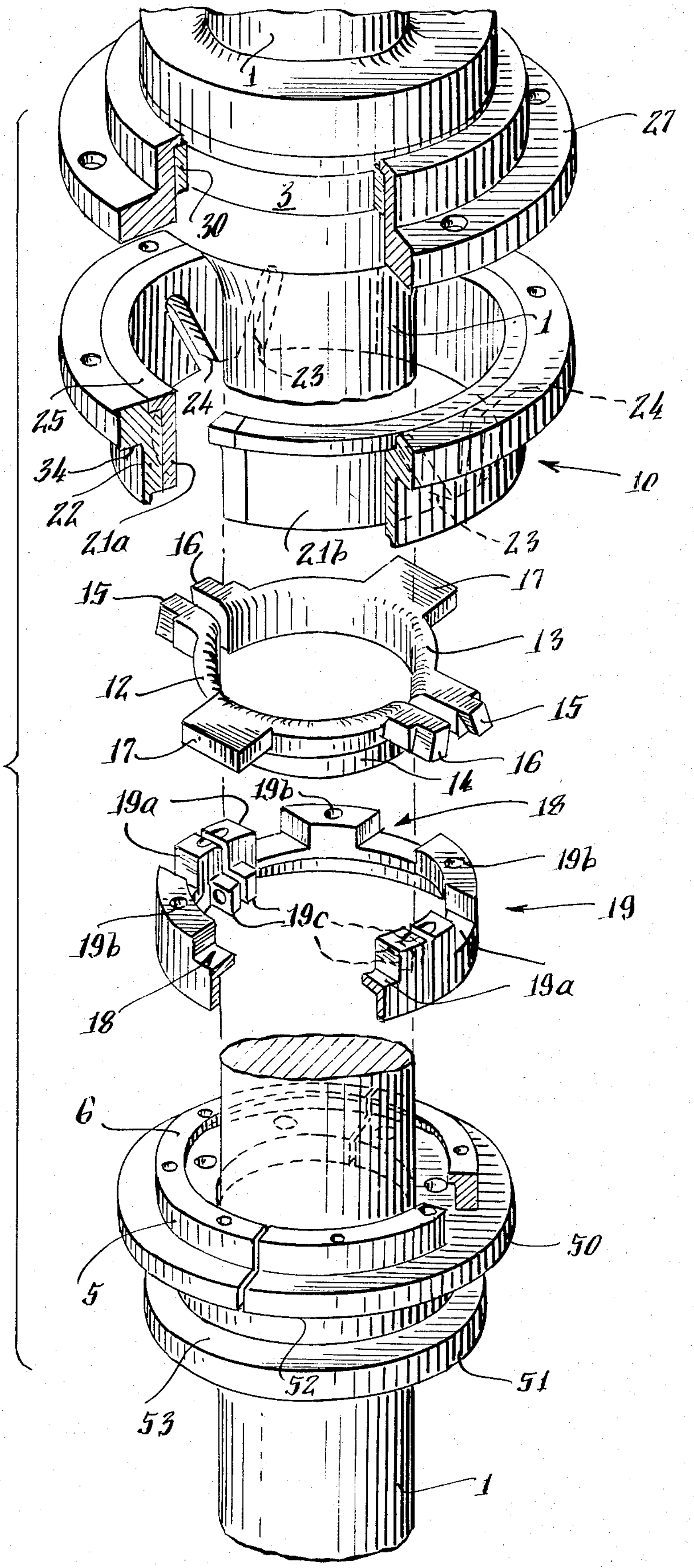
FIG. 3 is an exploded perspective view showing the principal parts of the latching mechanism separated from one another.
Figure 5:
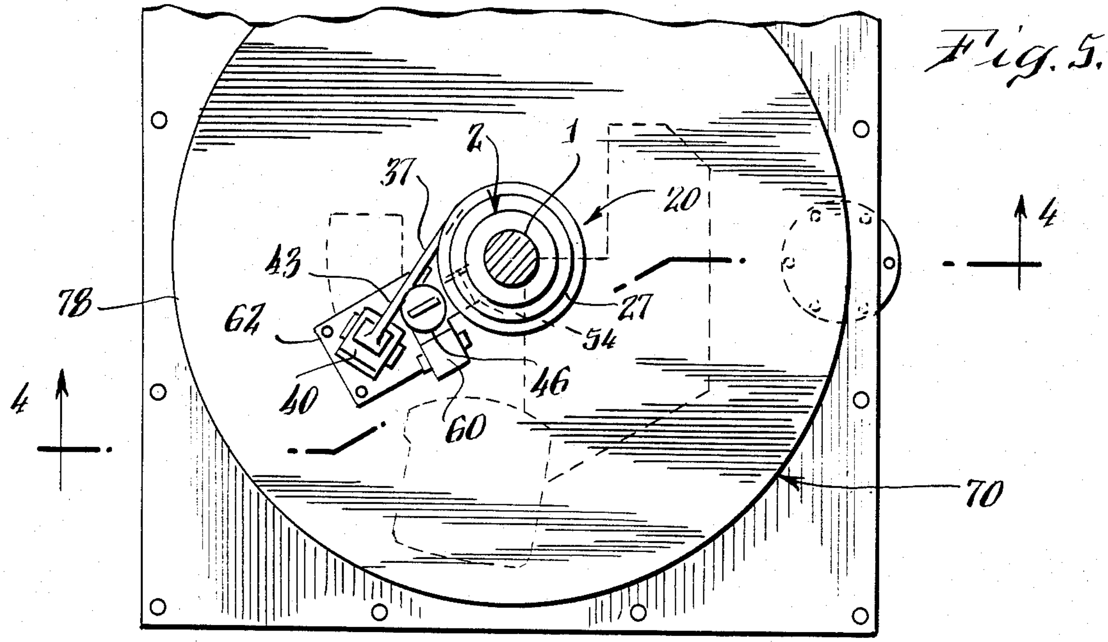
FIG. 5 is a plan view of the centrifugal assembly of FIG. 4.
Figure 4:
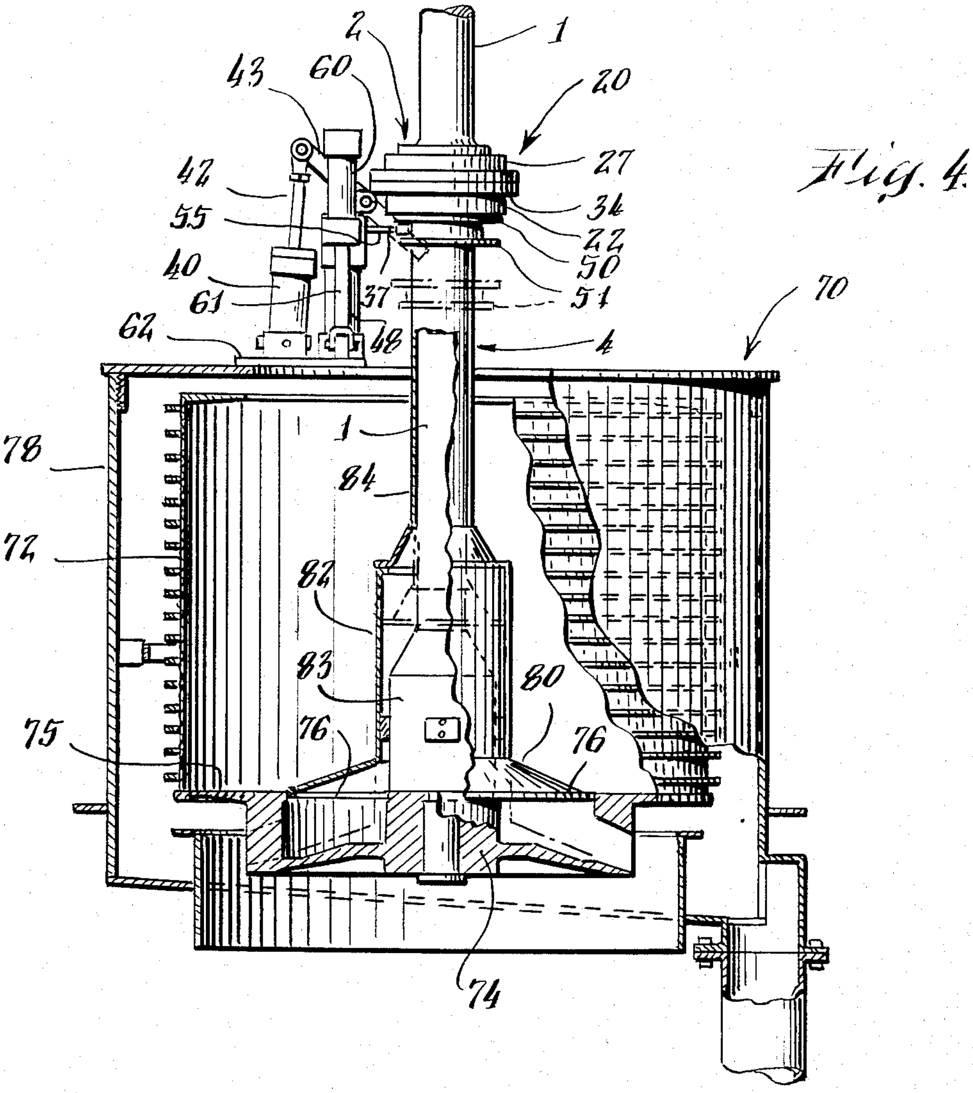
FIG. 4 is an elevational view, partly in section, of the latching mechanism of FIGS. 1-3 and related operating means as applied to a heavy-duty cyclical centrifugal machine for securing the basket bottom valve member of the machine in closed position.
Figure 6:
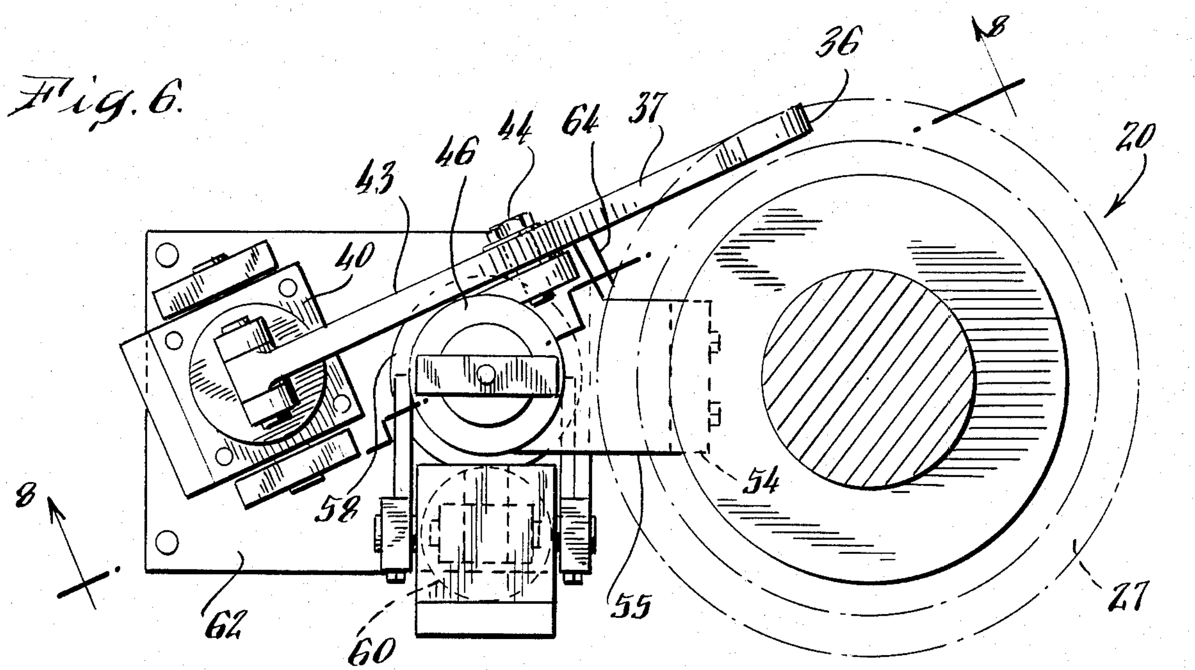
FIG. 6 is a plan view of operating means for the basket valve member and the latching mechanism of the centrifugal machine.

Referring to FIGS. 1 to 3 of the drawings, a latching mechanism indicated generally by numeral 10 is shown applied to a rotary shaft or spindle 1 for securing in a certain axial position, e.g., near the location of a joint 2 interconnecting portions of the shaft, a part 4 which is concentric with the shaft and is displaceable axially to that position from a position away from the latching mechanism such as that shown by unbroken lines in FIG. 1. While the axis of the shaft and related parts as shown is vertically disposed, it will be evident that the mechanism can serve as well for a horizontal or other inclined disposition of the axis.

The latching mechanism 10 comprises latch means having the form of slide jaws 12 and 13 which are rotated with the shaft 1 and are displaceable radially relative to it between a latching position indicated by broken lines in FIG. 1 and an unlatching position indicated by unbroken lines. Secured to the axially displaceable part 4 is a latchable member, preferably in the form of a ring 5, which is disposable in the path of the slide jaws 12 and 13 by axial movement of part 4 to its certain position adjacent to mechanism 10. When part 4 is in that position, elements of the latch means, such as radially protruding lip portions 14 of the slide jaws 12 and 13, are engageable with the latchable member, as by being displaced radially outward by the slide jaws to a latching position in which the lip portions 14 underlie an inwardly directed annular lip 6 of ring 5. The portions 14 are disengageable from the lip 6 by inward radial movement of the slide jaws to unlatching position, thus releasing the part 4 for axial displacement away from mechanism 10.

For moving the slide jaws between the latching and unlatching positions a suitable displacing means is mounted on and movable relative to the shaft 1. This displacing means, in the form shown, includes a ring member 20 which is concentric with the shaft and comprises cam elements, such as pairs of oppositely disposed slots 23 and 24 sloped at an angle to the axis of rotation of the system. Ring member 20 as shown includes an inner ring means 21*a*–21*b* and an outer ring 22 that encompasses and is joined to the inner ring means. The inner ring means conveniently is composed of two mating half rings 21*a* and 21*b* (FIG. 3), with a pair of the cam slots 23 and 24 formed in each half ring.

The half rings 21*a* and 21*b* have edge flanges 25 which seat in an edge recess 26 of the outer ring 22 and are held in place by a separable upper part, a guide ring 27, of ring member 20. The guide ring 27 is formed with a cylindrical inner surface 28 which bears against and is slidable axially on a bushing ring 30 fitted in a recess 3 about the shaft joint structure 2. An inward flange 29 on the upper end of guide ring 27, by engaging the upper side of bushing 30, limits the downward axial movement of ring member 20. Its upward axial movement is limited by engagement of the upper end of the inner ring means 21*a*–21*b* with the lower side of bushing 30.

As may be seen in FIG. 2, the slide jaws 12 and 13 have an arcuate form and are disposed symmetrically about the axis of the concentric shaft part 1 of the mechanism. Each slide jaw comprises, in addition to a radially protruding lip portion 14 for latching engagement with the ring lip 6 of displaceable part 4, opposite end portions 15 and 16 which protrude into the slots 23 and 24 of one of the pairs of cam slots formed in the half rings of ring member 20. Each slide jaw is held slidably in working position by a radially outwardly protruding head portion 17 of the slide jaw, which portion is slidable radially in a radial socket 18 formed in a fixed supporting ring 19.

The ring 19 also has slots 19*a* formed in it, thru which arms extending to the end portions 15 and 16 of the slide jaw pass to the slots 23 and 24. Ring 19 comprises two halves suitably fastened together, as by ears 19*b* fixed to the ends of each ring half and bolted together where the ends meet. The ring 19 is fixed in place by bolts which extend thru bores 19*c* in the ring and are threaded into a base portion 2*a* of the shaft joint structure 2.

In the illustrated embodiment of the invention, the ring member 20 normally is disposed in its lower position relative to the shaft 1 as indicated by broken lines in FIG. 1, in which position the slide jaws 12 and 13 are disposed radially outward in latching position with their respective protruding end portions 15 and 16 lying in upper regions of the slots 23 and 24. The slots 23 and 24 of each pair are sloped downward and inward toward the axis of rotation of the mechanism. It results that upon upward displacement of the ring member 20 to a position as shown by unbroken lines in FIG. 1, the end portions 15 and 16 of the slide jaws follow the slope of the slots and are displaced radially inward so as to displace the slide jaws and their lip portions 14 radially inward to unlatching position.

In a vertical disposition of the mechanism as shown, the ring member 20 normally will fall by gravity from its upper position to its lower position, thus displacing the slide jaws 12 and 13 to latching position. On the other hand, when being rotated the slide jaws exert a centrifugal force that urges them radially outward, and can hold them securely in latching position irrespective of the disposition of the axis of the mechanism.

Displacements of the ring member 20 away from its normal position can be effected by any of various operating devices. In the illustrated arrangement, the outer ring 22 of ring member 20 presents a downwardly facing annular surface 34 which is engageable slidably by a bearing member 36 carried on an arm 37 mounted beside the shaft 1. When the displaceable part 4 is to be moved into or from its locked position at mechanism 10, the arm 37 can be lifted, for instance by suitable motor means, so that the bearing member 37 will press against surface 34 and then will lift the ring member 20, thus displacing the slide jaws 12 and 13 radially inward through the cam action of the slots 23 and 24 on the slide jaw end portions 15 and 16. A subsequent lowering of the arm 37 by the motor means will then release the ring member 20 for downward movement to dispose the slide jaws in their normal latching position. A suitable motor means for moving the arm 37, as shown in FIGS. 4 to 8, comprises a fluid pressure operated cylinder 40 which has its piston 42 connected pivotably with an end portion 43 of a lever that extends into the arm 37 and has a fulcrum 44 fixed to a bracket 46 fastened on a post 48.

Movements of the displaceable part 4 into and away from its locked-up position at mechanism 10 can also be effected by any of various operating devices. In the illustrated arrangement, which is designed for latching a centrifugal basket bottom valve member in closed position, the part 4 is a sleeve or spacer member that surrounds the shaft 1 and has vertically spaced annular flanges 50 and 51 secured to its upper end. These flanges form walls of an outwardly open annular space or channel bordered by upper and lower wall surfaces 52 and 53. A slide member 54 is held in that space by a support 55 which can extend from a device slidable along the axis of the shaft 1, such for instance as the slide device 58 shown in FIGS. 4–8, and the axially slidable device can be positioned by suitable power operated or motor means such, for instance, as a second fluid pressure cylinder 60 as shown in FIGS. 4–8. The piston 61 of cylinder 60 is fixed pivotably to a base 62, and its body is linked to the slide device 58 for positioning it.

Upon downward movement of the slide device 58 with support 55 by the cylinder 60, the ring member 20 having already been moved upward to displace the latching lip portions 14 radially inward, the slide member 54 is moved downward against and then with the lower channel wall surface 53 to lower the part 4 away, by force if necessary, the position in which it is latched by mechanism 10. Upon subsequent upward movement of the slide device by the cylinder 60, the slide member 54 is moved upward against and then with the upper channel wall surface 52 to displace the part 4 into its position for being latched by mechanism 10. With part 4 in that position and the ring member 20 lowered again to its normal position for latching the lip portions 14 under the ring lip 6, the peripheral edge of the upper flange 50 on part 4 will preferably lie within the confines of a notch 59 inside the lower edge of ring member 20.

Figure 7:
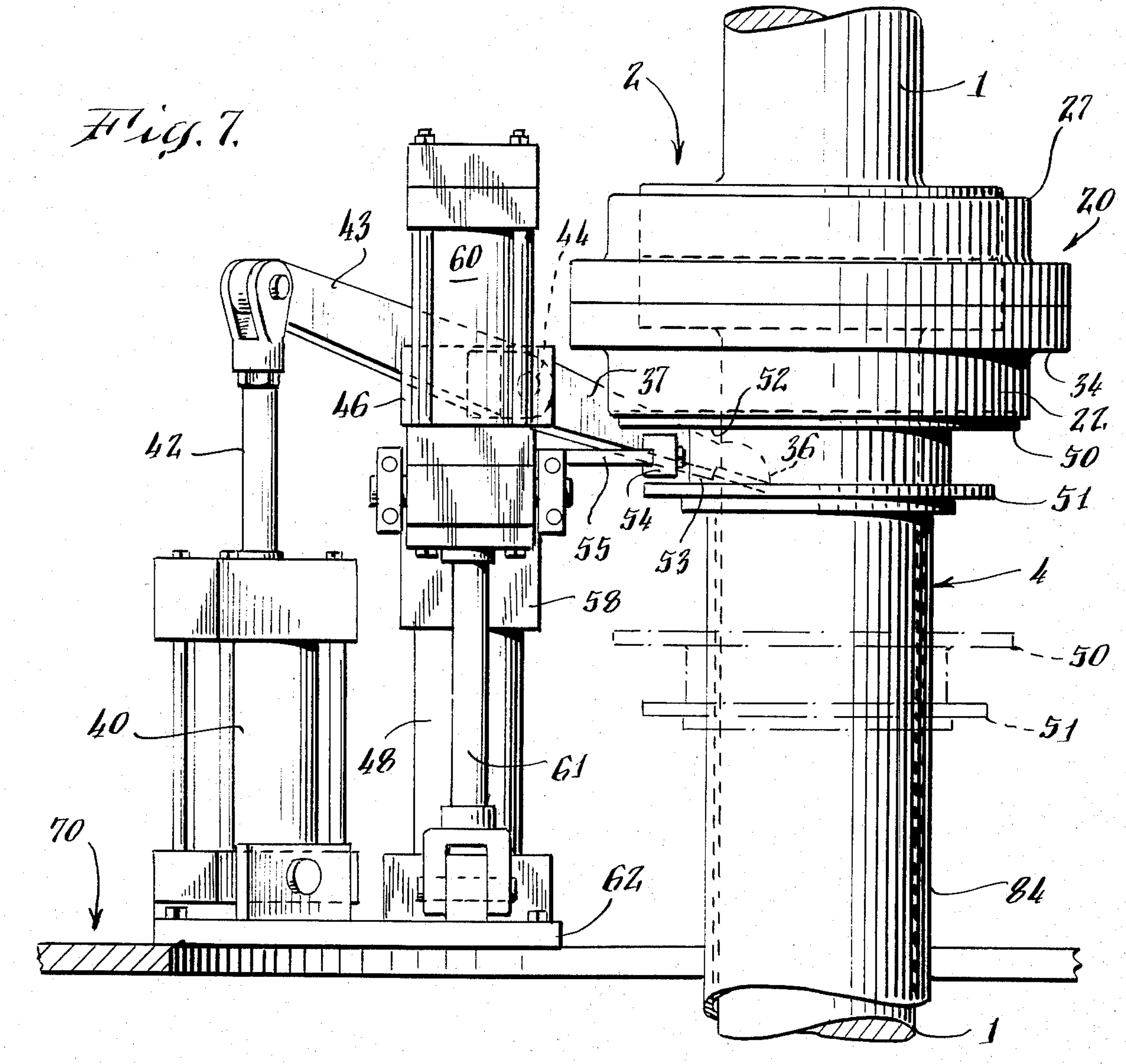
FIG. 7 is a side elevational view of such operating means.
Figure 8:
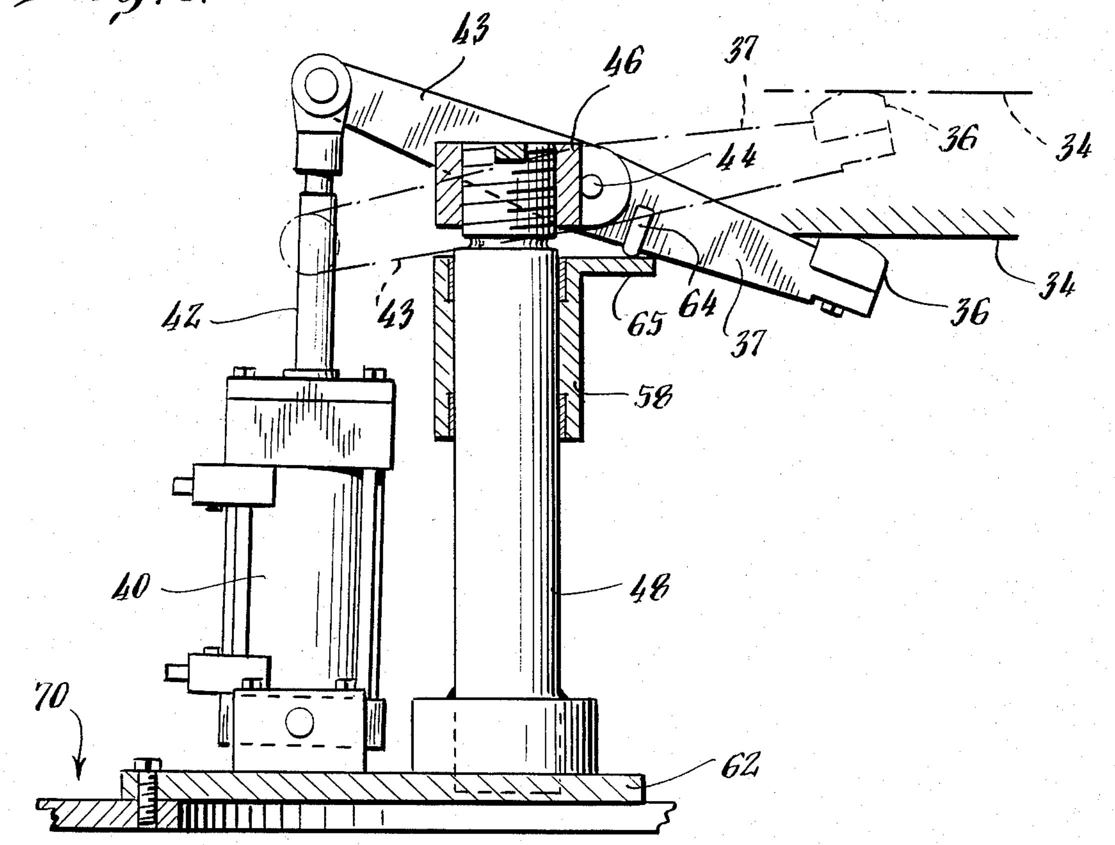
FIG. 8 is another side elevational view, partly in section, of parts of such operating means.

When the part 4 is latched to mechanism 10 the slide member 54 can be disposed at a location intermediate the channel walls 50 and 51, as shown in FIG. 7, where member 54 is out of contact with the surfaces 52 and 53 and will not in any way be worn by or affect the ensuing rotation of the rotary assembly. For this purpose, the arm 37 used for lifting the ring member 20 can be provided with means, such as a downwardly directed pin 64 (FIG. 8), which will bear against a flange 65 on the slide device 58 as the arm 37 nears its lowered position. A final lowering movement of arm 37 then will depress the slide device to a position in which the slide member 54 is held out of contact with the surfaces 52 and 53.

The latching mechanism of FIGS. 1–3 is shown in FIGS. 4–8 as it is applied to a suspended cyclical centrifugal machine 70 for latching the bottom valve member 80 of the centrifugal basket 72 in closed position during the loading and centrifuging stages of each centrifugal operating cycle. The basket 72, like the basket shown in U.S. Pat. No. 4,244,823, has a base structure 74 spaced below its bottom wall 75 and fixed to the lower end of the spindle 1. The spindle supports the basket via the base structure 74 and is suitably driven, as by an overhead motor, for rotating the basket to a high, centrifuging speed in each operating cycle of the machine. The bottom wall 75 has an opening 76 therein about the spindle, which opening normally is kept closed by the valve member 80 but can be opened by downward movement of the valve member so that solids to be discharged from the basket at the end of each cycle can fall freely through the opening 76 and then away through the space between the base structure and bottom wall 75.

The basket bottom valve member 80 surrounds the spindle 1 and has a base portion of frusto-conical form which fits in the bottom outlet opening 76. A wide cylindrical spacer portion 82 extends upward from the conical base portion about an enlarged base portion 83 of the spindle and then merges into a tubular spacer member or sleeve 84, itself merging into and becoming displaceable part 4 of the latching mechanism, which part extends upward about the spindle 1 to a location above the basket 72 and its surrounding curb structure 78. Rib elements fixed respectively to spacer portion 82 of the valve member and to the spindle base portion 83 require the valve member to rotate with the spindle but permit it to be displaced axially relative to the spindle.

In the operation of centrifugal machine 70, a cycle is started with the basket bottom valve member latched in closed position by engagement of the ring lip 6 secured to its part 4 over the lip portions 14 of the slide jaws 12 and 13 of mechanism 10. Such engagement is effected by first activating air cylinder 40 to lift ring member 20 on bearing member 36; then actuating air cylinder 60 to lift part 4, via slide member 54 and flange 52, to the position shown by broken lines in FIG. 1 and by full lines in FIGS. 4 and 7; and then actuating cylinder 40 to lower arm 37, let ring member 20 fall to latching position, and then depress slide member 54 to a location clear of flanges 52 and 53 as seen in FIG. 7. The basket with its bottom valve held closed is then rotated to a speed suitable for loading it evenly and the material to be centrifuged, such as sugar massecuite, is poured into it until the material has formed an even charge wall of the desired thickness against the side wall of the basket. Then the basket is accelerated to its full rotational speed for the centrifugal separating and drying stages of the operation, after which the basket assembly is braked to low or zero speed. The centrifuged solids are discharged from the basket in known manner while it is rotated at a low speed. To prepare it for the discharging stage, air cylinder 40 is again actuated to lift ring member 20, thus releasing the displaceable part 4 and the valve member 80 from the latching mechanism 10, and air cylinder 60 is actuated to force slide member 54 and part 4 downward so that the valve member 80 is disposed in open position. Then the solids are discharged through the outlet opening 76, after which the valve member is again latched in closed position in readiness for a new cycle of the centrifugal operations.

It will be noted that, as a result of the bottom valve member 80 being held latched securely in closed position via part 4 and mechanism 10 when the centrifugal basket 72 is being loaded and while it is rotated to and from its high speed in each cycle, no spring action or other strong force applying means is needed to keep the basket bottom outlet opening closed. Further, the latched valve member prevents material from being lost from the basket through the outlet opening either under the force of a heavy load poured into the basket or in the event of a heavy basket charge already in the basket slumping onto the valve member at a low speed of rotation.

We claim:

1. A latching mechanism for securing in a certain axial position a rotary part that is displaceable axially relative to a concentric rotary part, comprising:

latch means rotated with the concentric part and displaceable radially relative thereto between a latching position and an unlatching position;

a latchable member secured to the axially displaceable part and disposable in the path of said latch means by axial movement of said displaceable part to said certain position;

said latch means and said latchable member respectively comprising elements which, with said displaceable part in said certain position, are interengageable to prevent axial displacement of said displaceable part and are disengageable to release the same, respectively, by radial movements of said latch means between its said positions; and displacing means on and movable relative to said concentric part for moving said latch means between the latching and unlatching positions.

2. A latching mechanism according to claim 1, said latch means being disposed radially inward when in unlatching position and being displaceable and holdable radially out ward to latching position by centrifugal force upon being rotated with said concentric part toward its full rotational speed.

3. A latching mechanism according to claim 1 or 2, said displacing means including a ring member which is concentric with said concentric part and comprises cam elements slidably engaging with follower elements on said latch means for moving said latch means between the latching and unlatching positions.

4. A latching mechanism according to claim 3, said latch means comprising arcuate slide jaws disposed symmetrically about the axis of said concentric part, each of said slide jaws having a radially protruding lip portion to engage with said latchable member and having on opposite ends thereof protruding end portions constituting said follower elements.

5. A latching mechanism according to claim 4, said latchable member comprising a ring having an inwardly directed annular lip that overlies said lip portions of said slide jaws in latching position.

6. A latching mechanism according to claim 4, said ring member being displaceable axially relative to said concentric part, said cam elements comprising pairs of oppositely disposed slots in said ring member which are sloped at an angle to said axis, said protruding end portions of each of said slide jaws being engaged slidably in the slots of one of said pairs.

7. A latching mechanism according to claim 6, said ring member including inner ring means formed with said pairs of slots and an outer ring encompassing and joined to said inner ring means, said outer ring having thereon a guide ring slidable axially on an annular bushing fitted about said concentric part.

8. A latching mechanism according to claim 6, said concentric part being a normally vertical shaft, said ring member being normally disposed in a lower position relative to said shaft, in which said slide jaws are disposed radially outward in latching position and said protruding end portions lie in upper regions of said slots, the slots of each of said pairs being sloped downward and inward toward said axis so that said slide jaws are displaceable radially inward to unlatching position by upward displacement of said ring member.

9. A latching mechanism according to claim 8, and latch operating means including a downwardly facing annular surface on said ring member, an arm mounted beside said shaft and carrying a bearing member engageable slidably against said surface, and motor means for lifting said arm so as to engage and lift said ring member on said bearing member and thereby move said latch means to unlatching position when said displaceable part is to be displaced into or from said certain position.

10. A latching mechanism according to claim 9, said motor means being operable to lower said arm and thereby release said ring member for downward movement to said lower position when said displaceable part is in said certain position.

11. A latching mechanism according to claim 10, and means for positioning said displaceable part axially of said shaft including confronting upper and lower annular surfaces spaced apart axially and secured to said displaceable part, axially slidable means holding a slide member in the space between said surfaces, and power operated means for moving said slidable means and thereby said slide member upward against and then with the upper of said surfaces to displace said displaceable part into said certain position, and for moving the same downward against and then with the lower of said surfaces to displace said displaceable part away from said certain position; said arm having thereon means operative in a lowered position thereof when said displaceable part is in said certain position to dispose said slidable means at a location in which said slide member is out of contact with said surfaces.

12. A latching mechanism according to claim 11, said motor means comprising a fluid pressure cylinder the piston of which is connected pivotably with one end of a lever that is fulcrummed between its ends and carries said bearing member on its other end; said power operated means including a second fluid pressure cylinder the body of which is displaceable axially on a relatively fixed piston and has said slidable means fixed to said body.

13. In centrifugal apparatus including a centrifugal basket having a base structure spaced below its bottom wall and fixed to the lower end of a vertical spindle supporting the basket and for rotating it to high speed, said bottom wall having an opening therein about said spindle for discharge of centrifuged solids downward and then away from said base structure, a basket bottom valve member surrounding and rotatable with said spindle and displaceable axially relative thereto between a position closing said opening and an open position spaced below said opening, and means for positioning said valve member including a spacer member fixed to it and extending upwardly from it about said spindle and a valve operating mechanism engageable with means on said spacer member for moving said valve axially between said positions; a latching mechanism according to claim 1 or claim 2 for securing said valve member in said closing position, said concentric part being said spindle, said displaceable part being said valve member with said spacer member fixed thereto, said certain position being said closing position, and said latchable member being secured to said spacer member.

14. Centrifugal apparatus according to claim 13, said displacing means including a ring member fitted on and displaceable relative to said spindle, said ring member comprising cam elements slidably engaging with follower elements on said latch means for moving said latch means between the latching and unlatching positions.

15. Centrifugal apparatus according to claim 14, said latch means comprising arcuate slide jaws disposed symmetrically about said spindle, each having a radially protruding lip portion to engage with said latchable member, and each having on opposite ends thereof protruding end portions constituting said follower elements.

16. Centrifugal apparatus according to claim 15, said latchable member comprising a ring surrounding said spindle and having an inwardly directed annular lip that overlies said lip portions of said slide jaws in latching position.

17. Centrifugal apparatus according to claim 15, said ring member being displaceable axially on said spindle, said cam elements comprising pairs of oppositely disposed slots in said ring member which are sloped at an angle to the axis of said spindle, said protruding end portions of each of said slide jaws being engaged slidably in the slots of one of said pairs.

18. Centrifugal apparatus according to claim 17, said ring member including inner ring means formed with said pairs of slots and an outer ring encompassing and joined to said inner ring means, said outer ring having thereon a guide ring slidable axially on an annular bushing fitted about said spindle.

19. Centrifugal apparatus according to claim 17, said ring member being normally disposed in a lower position on said spindle with said slide jaws disposed radially outward in latching position and with said protruding end portions lying in upper regions of said slots, the slots of each of said pairs being sloped downward and inward toward said axis so that said slide jaws are displaceable radially inward to unlatching position by upward displacement of said ring member.

20. Centrifugal apparatus according to claim 19, and latch operating means including a downwardly facing annular surface on said ring member, an arm mounted beside said spindle and carrying a bearing member engageable slidably against said surface, and motor means for lifting said arm so as to engage and lift said ring member on said bearing member and thereby move said latch means to unlatching position when said valve member is to be displaced into or from said closing position.

21. Centrifugal apparatus according to claim 20, said motor means being operable to lower said arm and thereby release said ring member for downward movement to said lower position when said valve member is disposed in said closing position.

22. Centrifugal apparatus according to claim 21, said means for positioning said valve member including confronting upper and lower annular surfaces spaced apart axially on said spacer member, axially slidable means holding a slide member in the space between said surfaces, and power operated means for moving said slidable means and thereby said slide member upward against and then with the upper of said surfaces to displace said valve member into said closing position, and for moying the same downward against and then with the lower of said surfaces to displace said valve member to open position; said arm having thereon means operative in a lowered position thereof when said valve member is in said closing position to dispose said slidable means at a location in which said slide member is out of contact with said surfaces.

23. Centrifugal apparatus according to claim 22, said motor means comprising a fluid pressure cylinder the piston of which is connected pivotably with one end of a lever that is fulcrummed between its ends and carries said bearing member on its other end; said power operated means including a second fluid pressure cylinder the body of which is displaceable axially on a relatively fixed piston and has said slidable means fixed to said body.

* * * * *